INVENTORS
JACK V. FULTZ
RONALD E. MINES

FIG. 2 — PHASE SPLITTER

INVENTORS
JACK V. FULTZ
RONALD E. MINES
BY
*Robert D Rogers*
ATTORNEY

INVENTORS
JACK V. FULTZ
RONALD E. MINES

ATTORNEY

United States Patent Office 3,462,999
Patented Aug. 26, 1969

1

3,462,999
VIBRATION OVERSTRESS PROTECTION SYSTEM
Jack V. Fultz, Anaheim, and Ronald E. Mines, Garden Grove, Calif., assignors to North American Rockwell Corporation, a corporation of Delaware
Filed Feb. 3, 1967, Ser. No. 613,857
Int. Cl. G01n 29/00
U.S. Cl. 73—71.6                                7 Claims

ABSTRACT OF THE DISCLOSURE

A system for monitoring signals to and from a vibrating device and for converting the signals into digital signals indicating desired input and output signal levels. The system also includes a control circuit for terminating the test when certain conditions are detected over an integrated test cycle.

BACKGROUND OF THE INVENTION

Field of the invention

The invention relates to a system for monitoring test signals to and from a vibrating device and for terminating the test if digital signals are generated indicating that output and input signals are not present or are not within desirable limits.

Description of prior art

A patent search revealed the following related art.

Patent No. 2,935,671 to Ross for a Power Controlling Electrical Circuit teaches a system for monitoring the output vibrations of a mechanical apparatus. The test is discontinued when the vibrations of the apparatus exceed apparatus limitations. However, since the vibration limits set for the apparatus may exceed the limits of a component in a test, the component may be damaged even though the test apparatus is vibrating within required limits. In addition, there is no monitoring of input signals to the apparatus.

Patent No. 2,322,217 to Baird for Vibration Control Apparatus, provides transient control by including a capacitor in the input circuit. The capacitor charges and prevents undesirable large beginning vibrations. The system prevents the vibration apparatus from exceeding the limits of the apparatus and any component connected to the apparatus. Baird does not teach means for monitoring output vibration for peak signals and for the presence of signals indicating a normal operation.

Patent No. 3,095,532 to Floyd for a Vibration Responsive System for stopping motor driven machines teaches an amplitude monitoring system using a recorded vibration pattern for controlling vibrations of a cyclically operated machine.

Other systems may monitor inputs to or outputs from a vibration system but such systems do not completely protect the component being tested from an overstress condition. An overstress condition is said to exist when the component being tested is being vibrated in excess of its safe limits. For example, overstress can result from a malfunctioning test system, an operating error, broken or shorted signal cables, malfunctioning vibration sensor, etc. If only input signals or output signals are monitored, no safeguards are provided for the indicated error sources.

An input signal may be increased by an operator without realizing that the signal is already at a required test level. If only the output is monitored, the component and/or the test system may be damaged by an excessive input signal.

Desirably, a system should provide stress protection by monitoring input and output signals over an integrated,

2 or complete, test cycle. An integrated test cycle includes an initial period when the vibrations are building up and the period after the vibrations have built up to a desired level until the test is either completed or terminated. The input and output signals should be converted into fast response digital signals indicating true and false logical levels. The levels can be used to indicate normal or abnormal operating conditions. A control circuit should be included for terminating a test when the signals indicate abnormal conditions.

SUMMARY OF THE INVENTION

Briefly, the invention comprises vibration generator means for providing a signal to a test apparatus for vibrating the apparatus and the device attached to the apparatus within test limits. Overstress protection means are provided for monitoring signals to and from the apparatus over an integrated test cycle and for terminating the vibrations if abnormal conditions are indicated.

The protection means includes detector means for detecting abnormal input signals when the test is beginning and for detecting normal and abnormal output signals after the test has begun. A delay circuit is provided for preventing a logical change at the output of the detector means under normal conditions.

Therefore, it is an object of this invention to provide vibration overstress protection by monitoring signals to and from a vibration apparatus over an integrated test cycle and for terminating the test if the signals indicate abnormal operating conditions.

Another object of this invention is to provide a system which will not indicate an abnormal condition when the system is vibrating normally at relatively low frequencies.

Still another object of this invention is to provide a system which eliminates noise levels from the signals by converting the signals into digital signals.

A still further object of this invention is to provide a system which has a relatively fast response to the presence of a signal indicating an abnormal condition at the beginning of a test cycle.

It is another object of this invention to provide a vibration control system wherein monitored signals are converted into digital signals for controlling operation of the system.

A still further object of this invention is to provide a system for protecting a component, or device, under test from excessive vibration caused by open or shorted signal cables, malfunction of a vibration apparatus, and certain operator errors, whether such errors or circuit malfunctions are momentary or continuous.

These and other objects of this invention will become more apparent in connection with the following drawings.

DESCRIPTION OF THE PREFERRED EMBODIMENTS

Figure 1:
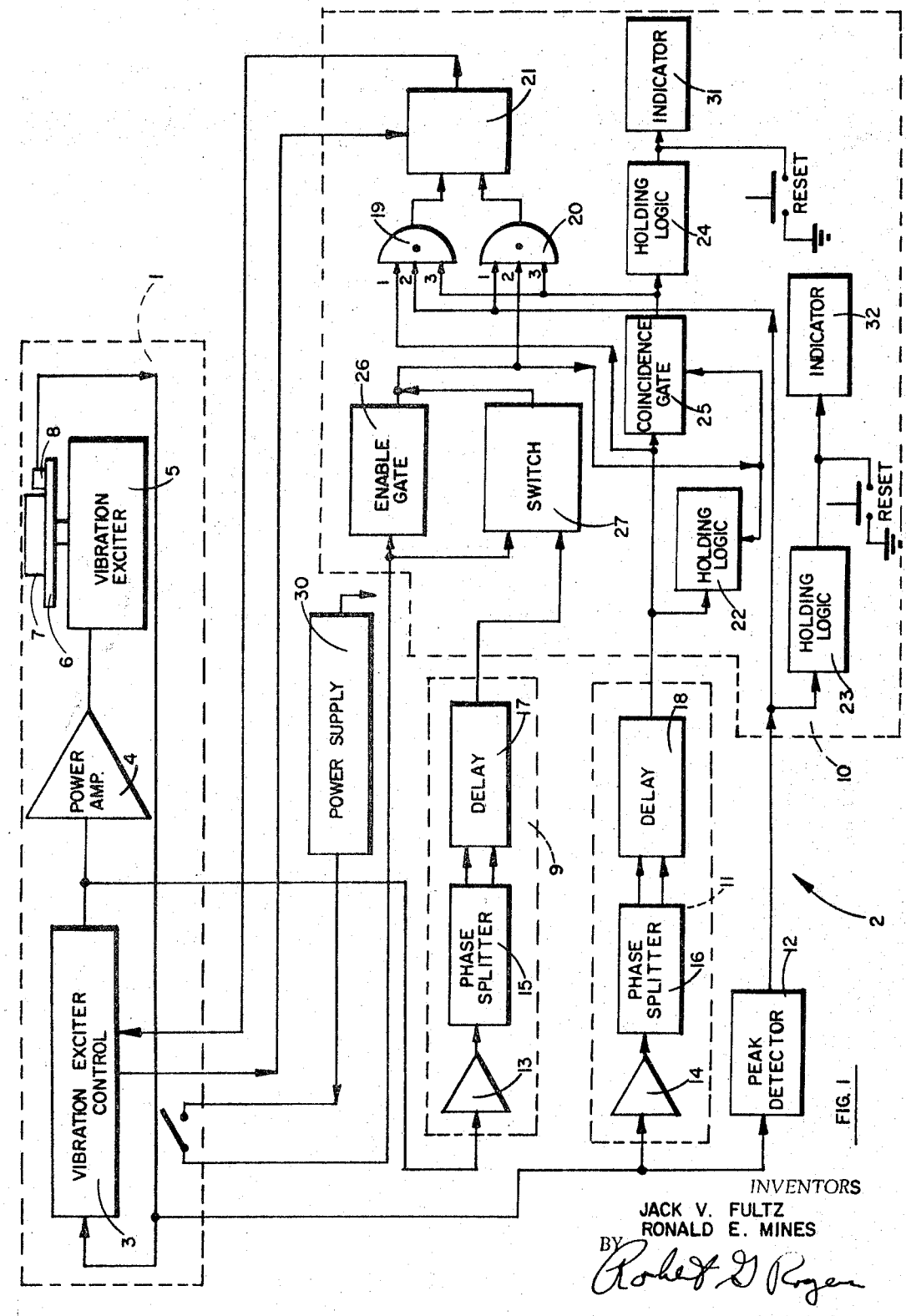
FIGURE 1 illustrates a block diagram of one embodiment of the test system.

Referring now to FIGURE 1, wherein is shown vibration testing system 1 and overstress protection system 2 which regulates the vibration system.

The vibration system comprises vibrator control circuit 3 which provides a signal to power amplifier 4 for driving vibration exciter 5. The exciter includes table 6 to which is mounted component 7. The component is vibration tested when table 6 is vibrated.

Transducer 8 is also mounted to the table for monitoring the vibrations of the component. Although a single transducer is shown, in other embodiments, a plurality of transducers may be used. In addition, the transducer or a plurality of transducers may be mounted on the component, table, or both, within the scope of the invention. All the elements of the testing system are believed to be well known in the art and commercially available.

Signals from the transducer are fed back to the control circuit 3 for regulating signals to the power amplifier. The frequency and amplitude of the vibration signals can be changed by the control circuit.

The overstress system comprises first signal detector means 9 connected to the input of the power amplifier 4 and logic 10. The detector could be connected to the output of the power amplifier in other embodiments. The first detector monitors for abnormal or excessive input signals to the vibrator when the test cycle begins. If an excessive input signal is detected, a digital signal is generated by the detector to the logic for terminating the test. The digital signal eliminates noise and distortion which accompanies an input signal.

Second signal detector means 11 is connected between the output of the transducer 8 and logic 10. The second detector senses normal output signals from the transducer and provides a digital signal to the logic indicating that the operation is normal. If no output signal is sensed, a digital signal is generated by the detector 11 to logic 10 for terminating the test.

Peak detector circuit means 12 is connected between the transducer output and logic for detecting output signals that exceed normal limits. If such an abnormal condition is detected, the peak detector generates a digital signal to the logic for terminating the test.

Power supply means 30 supplies power to the various parts of the overstress system. The vibration system includes separate power supply means.

The digital signals generated by the detectors have logically true or false levels. Detectors 9 and 11 comprise amplifiers 13 and 14, phase spliters 15 and 16, and delay circuits 17 and 18, respectively. The amplifiers comprise circuits well known in the art and are used to adjust the amplitude of the detected signals. The amplifier also prevents undesirable loading effects on the vibration system by the protection system.

Logic 10 comprises AND gates 19 and 20 which are connected to signal generator 21. Normally, the output from generator 21 is zero and the test continues. However, if an abnormal condition is detected, a test termination signal is generated. The signal generator may be comprised of a power NOR gating circuit or other circuits known in the art for generating a signal for terminating the test if the inputs from the AND gates are both false. The power for the circuit may be derived from the vibrator exciter control so that if the power supply for the overstress portion of the system fails, the NOR circuit is still enabled to terminate the test due to the false signals generated by the AND gates.

The AND gates and the NOR gate generating circuits are believed to be well known by those skilled in the art and are not described at length herein.

The logic also includes holding circuits 22 and 23 which are connected to the detectors 11 and 12 for holding the outputs from the detectors false once abnormal conditions are detected. A third holding circuit 24 is connected to the output of coincidence gate 25 for holding the output from the gate false when an abnormal condition is detected by detector 9 or detector 11. The coincidence gate is connected between detector 11 and AND gate 20 and includes inputs from detector 11 and enabling gate 26.

The holding circuits may be mechanized by circuits well known in the art, such as a standard R–S flip flop. R–S flip flops hold their outputs false after the output is set false, even though the input changes. In other words, the inputs to the holding circuit may comprise the output from an R–S flip flop. The holding circuits include resetting means for resetting the output true after having been set false by an input signal. The resetting means may comprise a switch connected between the base of an output transistor and ground for cutting the transistor off and restoring a true, or negative, output signal. In addition, each circuit includes an indicator means such as a lamp or buzzer for indicating overstress or abnormal conditions. For example, indicator means 31 and 32 are provided for holding circuits 24 and 23 respectively. The indicator stays on until the circuit is reset after corrective action is taken.

Enabling gate 26 is connected between the coincidence gate 25 and the power source 30. It provides outputs to holding circuits 22, AND gate 20, and the coincidence gate 25. In one embodiment, the enabling gate may be a one shot monostable multivibrator which is turned on at the beginning of a test cycle when its input is connected to the power source. The charges on a capacitor holds the circuit on until the capacitor is discharged below a certain level. The output stays on, or true, for a period sufficient to permit the input vibration signal to build up to a normal, or desired, level.

Switch means 27 may be an ordinary logic inverter combined with a resistor OR gate. The switch is connected between detector 9 and the output from the enabling gate. The switch also has one input connected to the enable gate's source of power. When the enable gate is connected to the source of power, the switch is also connected to the source of power. Ordinarily, that may be done by closing a switch momentarily and then opening it.

The output from the switch is false if either of its inputs is true. Under normal operating conditions, both inputs remain false after the enabling gate is turned on. However, if the input signal to the vibrator exceeds certain limits while the enable gate is on, the signal from detector 9 becomes true and the switch output is set false, which in turn sets the enable gate output false.

If the switch output goes false, the enable gate is also set false, even at the beginning of a cycle when the gate is providing a true signal. If the output from the enable gate is false, then regardless of the inputs to switch means 27, the output of the switch 27 remains false. The enable gate 26 and the switch 27 are used at the beginning of a test cycle to monitor the input signals during a period when the signal is being increased to its desired operating level.

Figure 2:
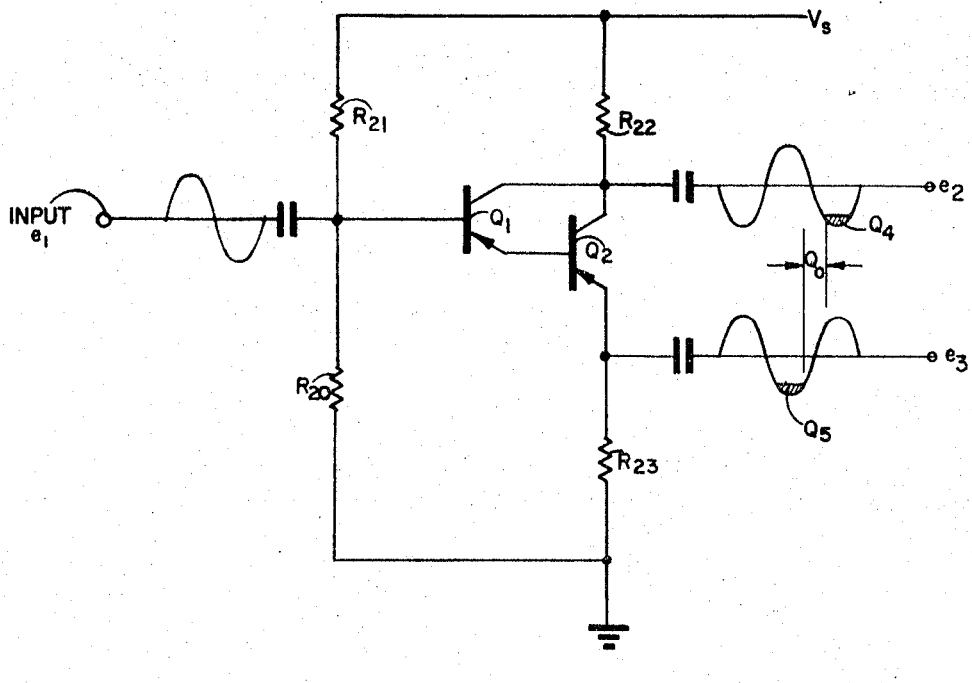
FIGURE 2 illustrates one embodiment of a phase splitter circuit.

FIGURE 2 shows one embodiment of a phase splitter circuit usable with both of the detectors. The circuit comprises transistor $Q_1$ having its base electrode connected through an input capacitor to an input terminal. Input signal $e_1$ is generated by the detector amplifiers. The emitter of $Q_1$ is connected to the base of transistor $Q_2$. The collector of $Q_1$ is connected to a source of voltage supply, $V_s$, through a resistor, R22. One output, $e_2$, is taken from the collector of $Q_1$. A capacitor is provided on the output for direct current isolation. The collector of $Q_2$ is connected to the collector of $Q_1$. The emitter of $Q_2$ is connected through a resistor to ground. The output, $e_3$, is taken from the emitter of $Q_2$. An isolation capacitor is provided at the $e_3$ output.

In operation, the input signal, $e_1$, is amplified by $Q_1$ and $Q_2$. In addition, $e_2$ is 180° out of phase with $e_3$ and $e_1$. Signals $e_3$ and $e_1$ are in phase. The output signals are approximately equal in magnitude. The phase change was necessary in order to properly drive the input devices of the delay circuit.

The particular embodiment shown provides a relatively high input impedance and high current gain. A relatively small input capacitance may be used with the circuit shown. Inasmuch as the frequencies used in the test may be low, i.e., 5 c.p.s., the capability of using a small capacitor is an advantage. Other embodiments comprising a single transistor may be used although the impedance and gain characteristics are not as desirable.

The shaded areas of the signals $e_2$ and $e_3$ represents the periods that the input devices of the delay circuits are turned on.

A D.C. differential amplifier could be used as a phase splitter. A phase splitter circuit is used in lieu of a transformer to achieve the out of phase signals because of the low frequencies normally used in vibration testing. For example, frequencies as low as one cycle per second may be encountered although a normal frequency of five cycles per second is utilized.

Figure 3:
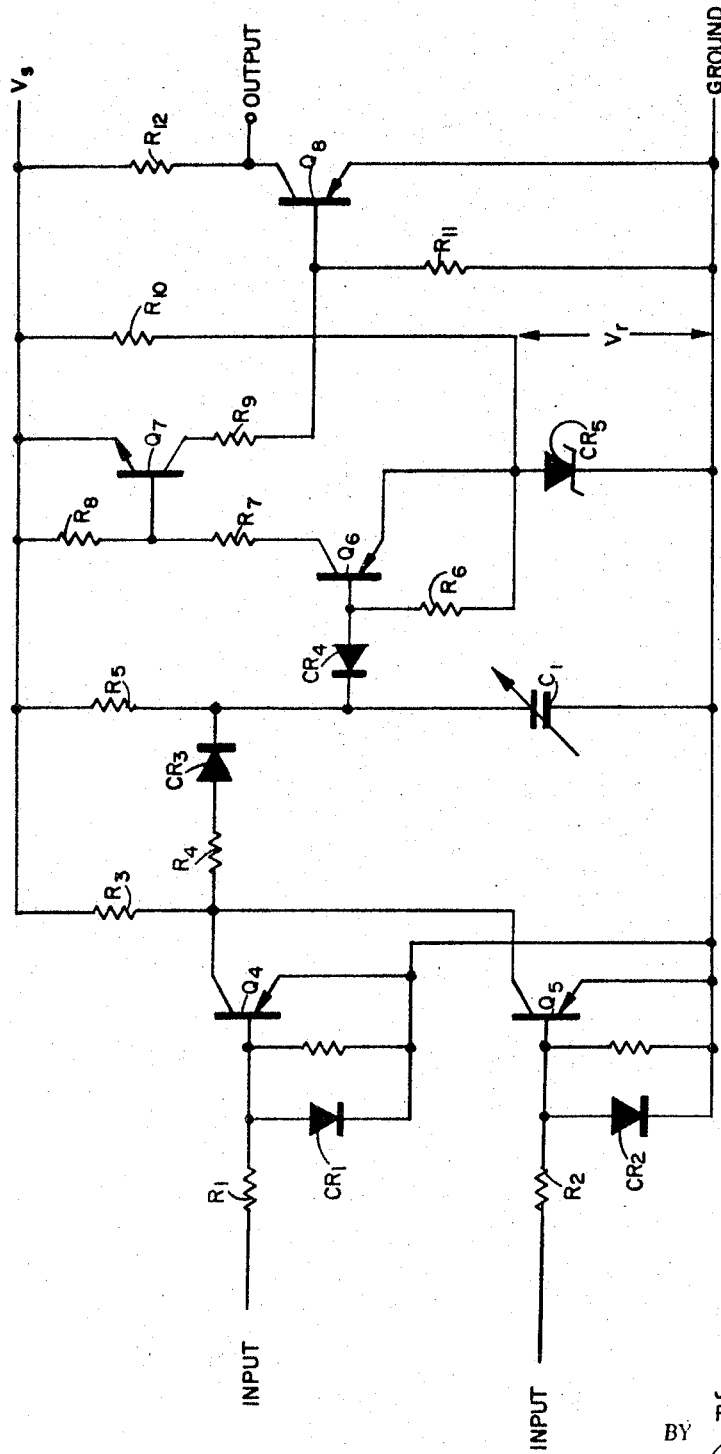
FIGURE 3 illustrates one embodiment of a delay circuit.

FIGURE 3 shows one embodiment of a delay circuit which can be used with both detectors. The circuit also performs a trigger function. The circuit is comprised of transistors $Q_4$ and $Q_5$ having their bases connected to receive the output signal $e_2$ and $e_3$ respectively, of the phase splitter. The transistor comprises the input device previously described. $CR_1$, $R_1$ and $CR_2$, $R_2$ provide constant loading for the phase splitter and protect the emitter base junctions of $Q_4$ and $Q_5$ from excessive input signals.

The collectors of $Q_4$ and $Q_5$ are connected to the supply voltage $V_s$ through $R_3$. The collectors are also connected to $R_4$ and $CR_3$. The negative side of $CR_3$ is connected between resistor $R_5$ and variable capacitor $C_1$. In other embodiments, $R_5$ could be made variable to change the charge time of capacitor $C_1$. The base electrode of transistor $Q_6$ is connected to $CR_4$ between $R_5$ and $C_1$. The constant reference voltage $V_r$ taken across $CR_5$ could be made variable by changing the type of device used. Resistor $R_6$ is connected between the base electrode of $Q_6$ and $CR_5$. The collector output from $Q_6$ is connected to the base electrode of $Q_7$. Resistor $R_7$ and $R_8$ provide control for $Q_7$.

The collector output from $Q_7$ is connected through resistor $R_9$ to the base of the output transistor $Q_8$. $CR_5$ is connected to $V_s$ through $R_{10}$ and provides a reference voltage, $V_r$. $R_{11}$ is connected between the base of $Q_8$ and ground. $R_{12}$ is connected between the output and $V_s$.

The circuit performs important functions in the system. For example, the signals generated by the transducer and the vibration exciter control, are normally sine wave signals and often have relatively high noise and distortion levels. In order to prevent a termination signal from being generated in response to noise, the signals are converted into digital signals by the delay circuit. As a result, the noise levels are minimized.

In addition, because of the low frequencies involved, the circuit must provide a delay so that during the time the input signals, $e_2$ and $e_3$, are passing through zero and below the threshold levels of the input devices, the output remains unchanged. However, the delay must be measured in terms of the lowest operating frequency, so that when an abnormal condition does exist, as when no output signal is detected by detector 11, a termination signal can be generated.

The amplifiers to each detector are used to scale the input signals so that a desired voltage level is provided to the delay circuits. For example, the signals to detector 9 are scaled down so that when a certain voltage level is reached, the detector responds quickly and generates a true signal to terminate the test. A fast response is necessary under these conditions.

The signal to detector 11, however, should be amplified to a normal level so that if the signal falls below the threshold level of the input device and remains for an abnormal period, a false signal is generated to terminate the test. Because of the inherent threshold levels of the input devices ($Q_4$ and $Q_5$), noise levels at the inputs of the device, such as 0.5 volt, do not turn the devices on. As a result, if an operating cable malfunction occurs, even though the noise level may approximate 0.5 volt, the delay circuit would still generate a logic level to terminate the test.

As shown in FIGURE 2, the period of time between $e_2$ and $e_3$ when $Q_4$ and $Q_5$ are not conducting, is shown as $Q_0$. The components of the delay circuit should be selected so that $Q_0$ should be less than the time required for $C_1$ to charge to the magnitude necessary to turn on $Q_6$. If $Q_0$ were equal to the time required to turn on $Q_6$, between the time the input signals had voltage levels less than the thresholds of $Q_4$ and $Q_5$, the output could change states and indicate a malfunction. However, the values of $C_1$, $R_5$ and $V_r$ are selected so that for the lowest frequency expected, $C_1$ does not charge to a value sufficient to turn $Q_6$ on. As a result, under normal operating conditions, the output remains the same even though the input transistors $Q_4$ and $Q_5$ are not conducting for a period of time.

If the delay is in excess of the normally expected delay for the detector 11 circuit, $Q_6$ is turned on and the output is caused to change states. If that occurs, a signal is generated to terminate the test. Since the output transistor, $Q_8$, is either on or off, the output signal has a digital form and the noise level is effectively filtered out.

In the case where the circuit is used as detector 9, if an input signal is received which is in excess of the prescribed limits, $Q_4$ and $Q_5$ conduct, and $C_1$ discharges through the relatively low resistance path of $CR_3$, $CR_4$, $Q_4$ or $Q_5$. As a result, $Q_6$ is turned off and $Q_8$ becomes true. The time delay is relatively short so that the output triggers switch 27 to set the enable gate 26 false. If the enable gate goes false during the initial portion of the test cycle, the test is terminated.

In operation, when signals $Q_4$ and $Q_5$ are turned on, as shown by the shaded area of $e_2$ and $e_3$ in FIGURE 2, $R_4$ is connected to ground and $C_1$ discharges through $CR_3$ and $R_4$ to ground. $R_4$ limits the current through $Q_4$ or $Q_5$. $CR_4$ is back-biased and $Q_6$ is cut off. When $Q_6$ is off, $Q_7$ and $Q_8$ are also cut off. As a result, the output from $Q_8$ is true. During $Q_0$, neither $Q_4$ or $Q_5$ conduct. When $Q_4$ and $Q_5$ are cut off, $CR_3$ is back-biased and cut off. $C_1$ begins to charge through $R_5$ towards $V_s$. $CR_3$ and $CR_4$ insure that the time constant is determined by $C_1$ and $R_5$. Reference diode $CR_5$ provides a voltage reference at the emitter of $Q_6$. When the voltage on $C_1$ is equivalent to $V_r$ plus the voltage drop across the emitter-base junction of $Q_6$ plus the drop across $CR_4$, $CR_4$ conducts and $C_1$ stops charging. When $CR_4$ conducts, $Q_6$ through $Q_8$ are turned on and the output is set false.

Figure 4:
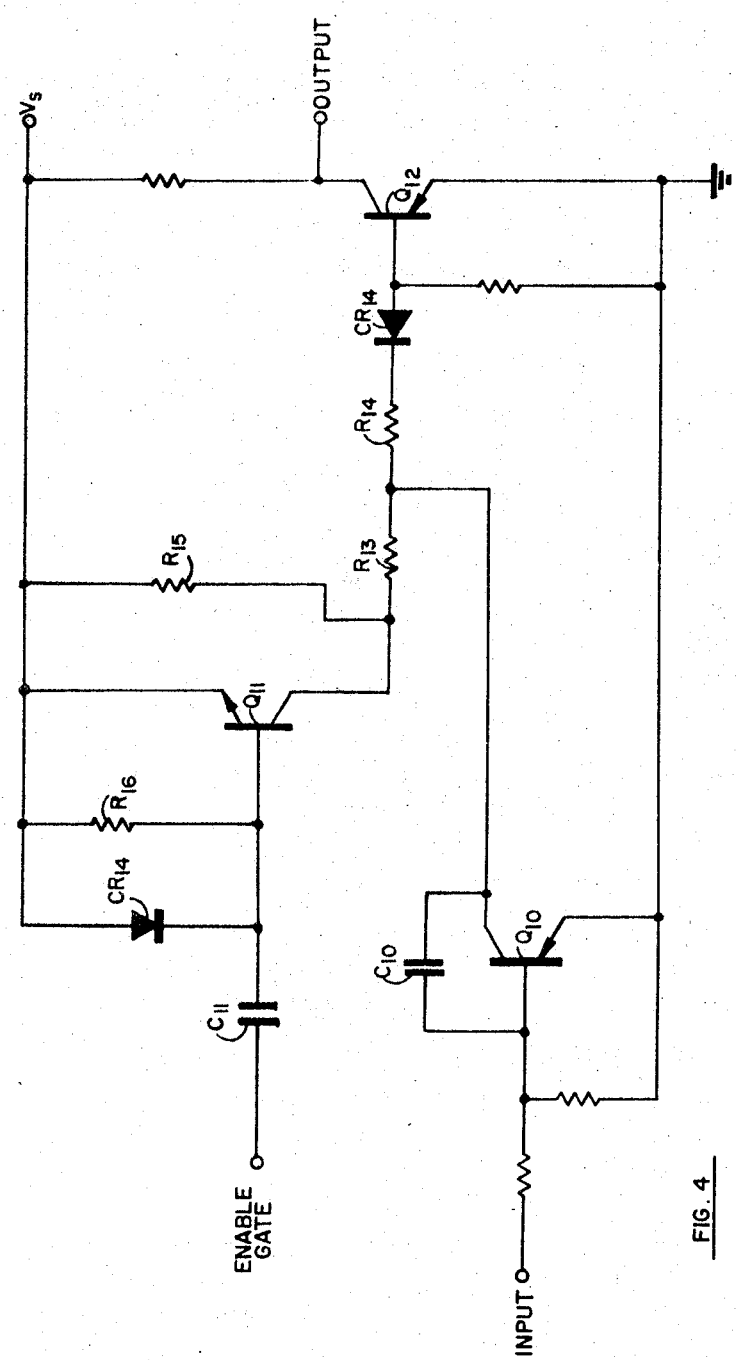
FIGURE 4 illustrates one embodiment of coincidence gate.

FIGURE 4 shows one embodiment of coincidence gate 25. Input transistor $Q_{10}$ conducts when a true signal is received from detector 11. capacitor $C_{10}$ slows down the switching speed of $Q_{10}$. The resistors are provided to set the loading and bias to base $Q_{10}$. The collector is connected to the collector of $Q_{11}$ through resistor $R_{13}$. Resistor $R_{15}$ connects the collector to voltage source $V_s$. $R_{16}$ connects the base of $Q_{11}$ to $V_s$. Diode $CR_{14}$ protects the emitter base junction of $Q_{11}$. Resistor $R_{14}$ is connected to the base electrode of transistor $Q_{12}$ through diode $CR_{14}$. $R_{14}$ and $CR_{14}$ insure that $Q_{12}$ cuts off completely. $Q_{12}$ is normally not conducting. $Q_{11}$ also has an input from the enable gate. Capacitor $C_{11}$ couples the transistor $Q_{11}$ to the enable gate.

Transister $Q_{11}$ conducts only during any true to false transition of the enable gate line.

In operation, the output from $Q_{12}$ is normally true. If the output from detector 11 is true during the termination of the enable gate output, that is when the enable gate goes from true to false, then the coincidence gate output remains true.

If the detector 11 output is false when the enable gate true signal is terminated, then the coincidence gate output becomes false momentarily during the true to false transition of the enable gate output. The holding circuit then holds the output false.

In operation, the enable gate is turned on and following turn on of the enable gate, the exciter circuit is also turned on to provide a signal to the vibrator. Initially, the transducer output signal is zero but builds up as the power amplifier input signal increases and the inertia of the vibrator is overcome. Until the output signal builds up to a sufficient level, the output from detector 11 remains false. Similarly, the output from the peak detector 12 is true during the initial part of the test cycle. The enable circuit remains on until the power amplifier input builds up to a relatively stable level and the transducer output signal has increased to a normal level.

During the initial interval, if the power amplifier input signal remains within normal limits, the output from detector 9 remains false and the switch output remains true until the end of the initial period. At the end of the period, the enable gate becomes false. The enable circuit component values are chosen to provide an enable "on" time equal to the signal build-up time of the particular vibration apparatus. The coincidence gate is normally always set true except during the time the enable gate changes from a true to a false level. At this time, if the output from detector 11 is also false, the coincidence gate goes false. It is held in a false state by holding circuit 24. As a result of the coincidence gate going false, a termination signal is generated to stop the test.

Therefore, during the initial portion of the test cycle, since gate 19 has a false input from detector 11, its output is false. However, gate 20 has two inputs from the coincidence gate and the peak detector which are normally true, and one from the enable gate. As a result, gate 20 is true. Since both signals to the termination generator are not false (indicating an abnormal condition), no termination signal is generated. However, if detector 9 had sensed a signal which exceeded input requirements, its output would have become true to set the output of the switch and, therefore, the enable gate false. Under those conditions, the coincidence gate would have been set false and both AND gates would have become false. When both AND gates are false, the signal generator means would have generated a signal for terminating the test.

After a short period, comparable to the true period of the enable gate, an output signal is detected by detector 11 and a true signal is generated. However, since by then under normal conditions, the output from detector 11 is true, the coincidence gate remains true. When detector 11 is true, the enable gate is normally false after the initial period. If detector 11 became false after the enable gate became false, both AND gates would be false and a test termination signal would be generated by generator 21 to stop the test.

In addition, if the output signal is detected by the peak detector which is in excess of a predetermined negative limit, the output from the trigger becomes false and is held false by the holding circuit. A false output signal causes both AND gates to become false so that a test termination signal is generated. Although the peak detector only detects negative going signals, it should be obvious that an additional detector with an OR gate could be added to detect both positive and negative going signals.

Although the invention has been described and illustrated in detail, it is to be understood that the same is by way of illustration and example only, and is not to be taken by way of limitation; the spirit and scope of this invention being limited only by the terms of the appended claims.

We claim:

1. A system for protecting vibration test apparatus and devices being vibration tested,
    first means for detecting excessive input signals to the test apparatus during an initial portion of a test cycle including first means for generating a digital signal if an input signal becomes excessive during the initial portion of the test cycle,
    second means for detecting normal output signals at least after the initial portion of said cycle including second means for generating a digital signal when the test apparatus fails to generate an output signal,
    third means for detecting excessive output signals including third means for generating a digital signal indicating that the output signal exceeds normal limits,
    termination means connected to said first, second and third means and responsive to said generated signals for generating a termination signal if said input signal exceeds normal limits during the initial cycle, if said output signal is zero after the initial portion of said test cycle, and if said output signals exceed normal limits,
    said first means for generating a digital signal includes delay means comprising capacitor means having one side connected to ground, a first switch means having a control electrode connected to the other side of said capacitor means, an output means, and second switch means connected to the other side of said capacitor means and having control electrode means responsive to said input signals for providing a relatively low impedance discharge path for said capacitor means when said limits have been exceeded.

2. a system for protecting vibration test apparatus and devices being vibration tested,
    first means for detecting excessive input signals to the test apparatus during an initial portion of a test cycle including first means for generating a digital signal if an input signal becomes excessive during the initial portion of the test cycle,
    second means for detecting normal output signals at least after the initial portion of said cycle including second means for generating a digital signal when the test apparatus fails to generate an output signal,
    third means for detecting excessive output signals including third means for generating a digital signal indicating that the output signal exceeds normal limits,
    termination means connected to said first, second and third means and responsive to said generated signals for generating a termination signal if said input signal exceeds normal limits during the initial cycle, if said output signal is zero after the initial portion of said test cycle, and if said output signals exceed normal limits,
    said first means for generating a digital signal includes means for dividing the input signal into signals of opposite phases with one of said signals indicating a signal in excess of the negative limits and the second of said signals indicating a signal in excess of positive limits,
    delay means including capacitor means having one side connected to ground, an output means connected to said termination means, and first switching means responsive to said signals for discharging the capacitor to a voltage level for setting said output means to a logical level indicating said limits have been exceeded.

3. A system for protecting vibration test apparatus and devices being vibration tested,
    first means for detecting excessive input signals to the test apparatus during an initial portion of a test cycle including first means for generating a digital signal if an input signal becomes excessive during the initial portion of the test cycle,
    second means for detecting normal output signals at least after the initial portion of said cycle including second means for generating a digital signal when the test apparatus fails to generate an output signal,
    third means for detecting excessive signals including third means for generating a digital signal indicating that the output signal exceeds normal limits,
    termination means connected to said first, second and third means responsive to said generated signals for generating a termination signal if said input signal exceeds normal limits during the initial cycle, if said output signal is zero after the initial portion of said test cycle, and if said output signals exceed normal limits, said second means for generating a digital signal includes capacitor means having one side connected to ground, output means connected to said termination means, second switching means having first, second and control electrodes with its control electrode connected to the other side of said capacitor means, a source of reference voltage connected to said first electrode, whereby said switch device becomes conductive when the capacitor voltage approximately equals the reference voltage for changing the voltage level on the second electrode, said output means being responsive to said change in voltage on the second electrode for setting the output of said output means to a logical level indicating that said levels have not been exceeded.

4. A system for protecting vibration test apparatus and devices being vibration tested, first means for detecting excessive input signals to the test apparatus during an initial portion of a test cycle including first means for generating a digital signal if an input signal becomes excessive during the initial portion of the test cycle, second means for detecting normal output signals at least after the initial portion of said cycle including second means for generating a digital signal when the test apparatus fails to generate an output signal, third means for detecting excessive output signals including third means for generating a digital signal indicating that the output signal exceeds normal limits, termination means connected to said first, second and third means and responsive to said generated signals for generating a termination signal if said input signal exceeds normal limits during the initial cycle, if said output signal is zero after the initial portion of said test cycle, and if said output signals exceed normal limits, said termination means comprises gating means having a plurality of inputs, and termination signal generator means connected to said gating means for generating a signal as a function of the outputs from said gating means, means for generating a signal having a first logical level during an initial period of said test cycle and for generating a signal having a second logical level during the remainder of the cycle, said means comprising an input to said gating means, means responsive to said first means for detecting for changing said first logical level to a second level if an excessive input signal is detected during the initial portion of the test cycle, said second means for detecting including means for generating a digital signal having a second logical level to said gating means during said first interval, and third detector means including means for generating a digital signal having a first logical level to said gating means except when an excessive input signal appears at its input.

5. A system for protecting vibration test apparatus and devices being vibration tested, first means for detecting excessive input signals to the test apparatus during an initial portion of a test cycle including first means for generating a digital signal if an input signal becomes excessive during the initial portion of the test cycle, second means for detecting normal output signals at least after the initial portion of said cycle including second means for generating a digital signal when the test apparatus fails to generate an output signal, third means for detecting excessive output signals including third means for generating a digital signal indicating that the output signal exceeds normal limits, termination means connected to said first, second and third means and responsive to said generated signals for generating a termination signal if said input signal exceeds normal limits during the initial cycle, if said output signal is zero after the initial portion of said test cycle, and if said output signals exceed normal limits, said termination means for generating a termination signal comprises logic means responsive to the digital signals of said means for detecting, said logic means comprising means for indicating if either of said signals exceeds prescribed limits and means for holding said indication until reset, and means for resetting the levels of said means for holding to a required logical state at the beginning of each test cycle.

6. A system for protecting vibration test apparatus and devices being vibration tested, first means for detecting excessive input signals to the test apparatus during an initial portion of a test cycle including first means for generating a digital signal if an input signal becomes excessive during the initial portion of the test cycle, second means for detecting normal output signals at least after the initial portion of said cycle including second means for generating a digital signal when the test apparatus fails to generate an output signal, third means for detecting excessive output signals including third means for generating a digital signal indicating that the output signal exceeds normal limits, termination means connected to said first, second and third means and responsive to said generating signals for generating a termination signal if said input signal exceeds normal limits during the initial cycle, if said output signal is zero after the initial portion of said test cycle, and if said output signals exceed normal limits, said second means (11) for generating a digital signal includes output switching means ($Q_8$) for providing digital signals having either a true or false logical level, said output switching means being connected to said termination means, first switching means ($Q_4$, $Q_5$) responsive to said input signals, capacitor means ($C_1$) having one side connected to ground and the other side connected to discharge said capacitor means through said first switching means when said switching means are turned on in response to said input signals, and having said other side connected through an impedance ($R_5$) to a source of potential ($V_s$) for charging the capacitor toward the level of said potential when said first switching means are turned off, second switch means ($Q_6$) having a control electrode connected to said other side of said capacitance means, a second electrode connected to said output switching means and a third electrode connected to a source of reference potential ($CR_5$) whereby when the capacitor charge approximately equals the reference voltage, said second switch means turns on and said output switching means changes from one of said logical levels to the other logical level for indicating an abnormal condition, and said reference potential, the time constant of said capacitor means and said impedance means have a relationship whereby the second switching means remains off until the test apparatus fails to generate an output signal after the initial portion of said cycle.

7. A system for protecting vibration test apparatus and devices being vibration tested, first means for detecting excessive input signals to the test apparatus during an initial portion of a test cycle including first means for generating a digital signal if an input signal becomes excessive during the initial portion of the test cycle, second means for detecting normal output signals at least after the initial portion of said cycle including second means for generating a digital signal when the test apparatus fails to generate an output signal, third means for detecting excessive output signals including third means for generating a digital signal indicating that the output signal exceeds normal limits, termination means connected to said first, second and third means and responsive to said generated signals for generating a termination signal if said input signal exceeds normal limits during the initial cycle, if said output signal is zero after the initial portion of said test cycle, and if said output signals exceed normal limits, first means (22) responsive to the digital signal from second detector means (11) after the initial portion for holding the output of said detector means at the logical level of said signal, second means (23) responsive to the digital signal from the third detector (12) for holding the output of said detector at the level of said signal, and third holding means (24) responsive to the digital signal from said first means for detecting (9) for terminating said test.

References Cited

UNITED STATES PATENTS

| | | | |
|---|---|---|---|
| 2,341,135 | 2/1944 | Baird | 318—127 |
| 3,056,910 | 10/1962 | Hajian | 73—71.6 XR |
| 3,354,372 | 11/1967 | Beasley | 318—460 |

RICHARD C. QUEISSER, Primary Examiner

J. R. FLANAGAN, Assistant Examiner